E. SEVERSON.
RAKE ATTACHMENT FOR MOWING MACHINES.
APPLICATION FILED NOV. 21, 1910.

1,001,777.

Patented Aug. 29, 1911.

2 SHEETS—SHEET 2.

Witnesses
Chas. L. Griestauer.
M. F. Peder.

Inventor
E. Severson,
By Watson E. Coleman,
Attorney

COLUMBIA PLANOGRAPH CO., WASHINGTON, D. C.

UNITED STATES PATENT OFFICE.

EDWIN SEVERSON, OF LIBERTY, NORTH DAKOTA.

RAKE ATTACHMENT FOR MOWING-MACHINES.

1,001,777.  Specification of Letters Patent.  Patented Aug. 29, 1911.

Application filed November 21, 1910. Serial No. 593,525.

*To all whom it may concern:*

Be it known that I, EDWIN SEVERSON, a citizen of the United States, residing at Liberty, in the county of Adams and State of North Dakota, have invented certain new and useful Improvements in Rake Attachments for Mowing-Machines, of which the following is a specification, reference being had to the accompanying drawings.

This invention is an improved rake attachment for mowing machines for collecting the hay as it is cut, and dumping the same in windrows, the invention consisting in the construction, combination and arrangement of devices hereinafter described and claimed.

Figure 1:
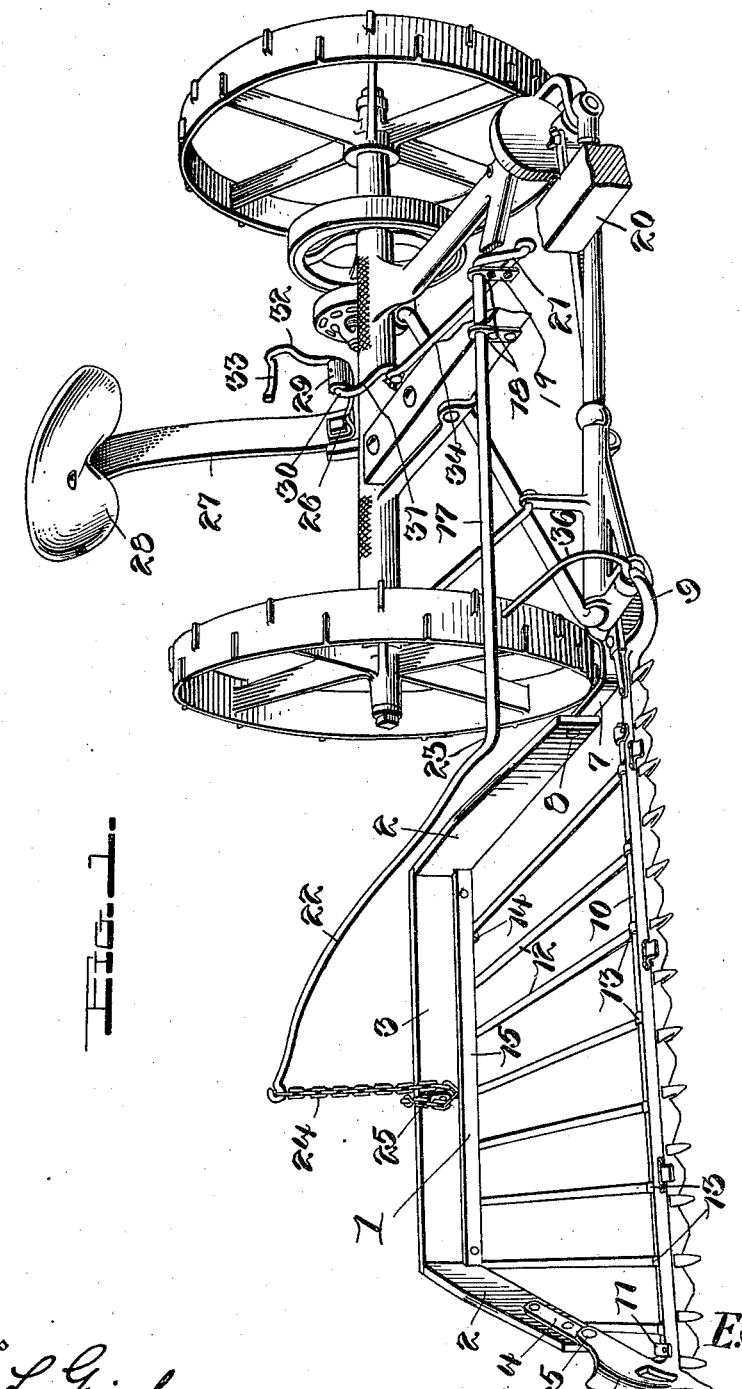
Figure 2:
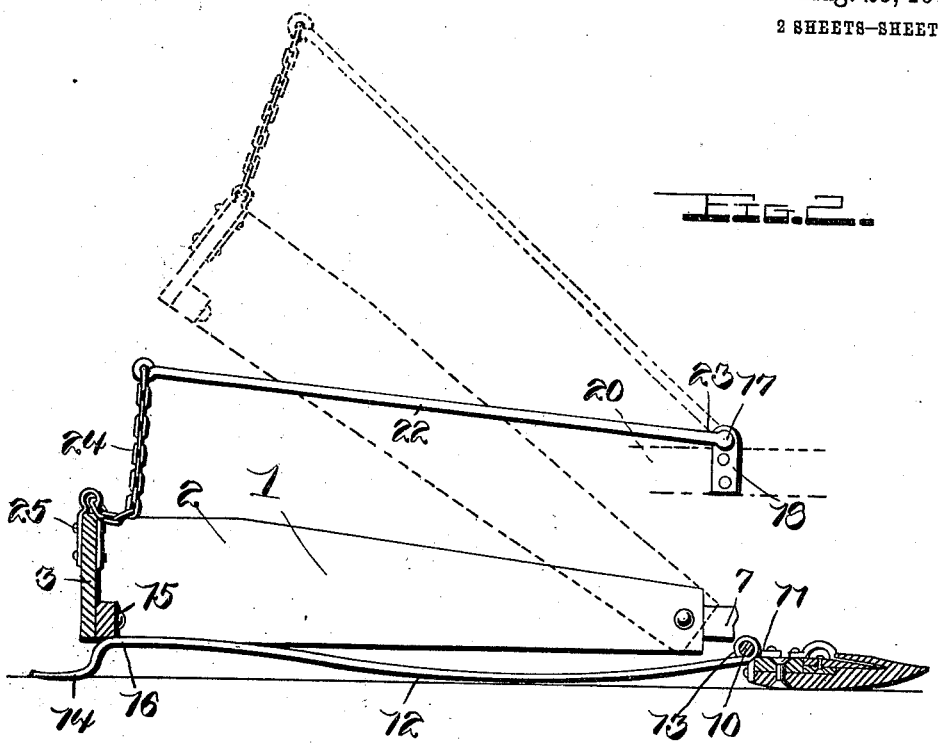
Figure 3:
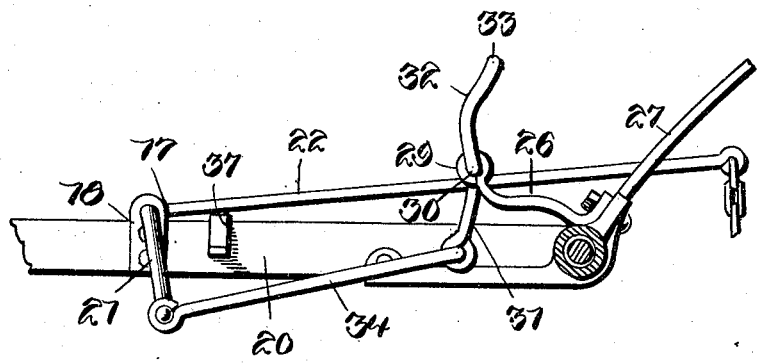

In the accompanying drawings—Figure 1 is a perspective view of a mowing machine provided with my improved rake attachment, the rake attachment being shown in lowered position. Fig. 2 is a transverse sectional view on a plane intersecting the cutting mechanism, and also intersecting my improved attachment, the attachment being shown in lowered position in full lines, and in raised position in dotted lines. Fig. 3 is partly an elevation and partly a section showing the means for raising and lowering my rake attachment.

For the purposes of this specification, I show my improved rake attachment in connection with a mowing machine of usual construction. In accordance with my invention I provide a gathering and dumping frame 1, which comprises a pair of side boards 2, and a rear board 3, the ends of which are secured to the rear ends of the side boards. The outer side board 2 is provided on its inner side at its front end with a hinge strap 4, which projects forwardly therefrom and is pivotally connected as at 5 to the divider 6 at the outer end of the finger bar of the machine. The inner side board 2 is provided at its front end on its outer side with a forwardly extending hinge strap 7 which is pivotally connected as at 8 to the runner or head 9, at the inner end of the cutter bar. I also provide a rod 10 which lies on the rear portion of the finger bar in rear of the cutter bar and has its ends secured by means of bolts 11 to the finger bar. A series of carrier straps or fingers 12 have their front ends provided with eyes 13 through which the said rod 10 extends so that the said carrier straps are pivotally connected to the said rod and the said carrier straps extend rearwardly from the finger bar and between the side boards 2 of the frame 1, to the rear board 3 of the said frame, and are provided at their rear ends with down-turned runner portions 14 which bear on the ground. These carrier straps are appropriately spaced apart and when the frame 1 is in lowered position so that the same trails on the ground together with the runner straps, in rear of the cutting mechanism, the hay as it is cut accumulates on the said runner straps, and is held in place thereon by the frame as will be understood. On the front side of the rear board 3 at the lower edge thereof is a bar 15 which is secured thereto by means of suitable bolts and when the frame is lowered, the said bar bears on the rearwardly extending portions 16 of the said carrier straps, at points slightly in advance of the runners, the latter serving to support the rear side of the frame slightly above the ground and enable the same to move smoothly over and cut the grass. I also provide a rock shaft 17 which is pivotally mounted in bearings 18 at the upper ends of a pair of standards 19 which are bolted to opposite sides of the tongue or pole 20 of the mowing machine. This rock shaft is provided at its inner end with a crank arm 21, and is provided at its outer end with a lifting arm 22, the said lifting arm being preferably a steel rod of suitable length, size and shape, the inner end of which is secured to the said rock shaft as at 23. The said lifter arm extends upwardly, outwardly and rearwardly from the outer end of the rock shaft 17, and its rear end is connected by a chain 24 to a hook plate 25 with which the rear board 3 of the frame 1 is provided. I also provide a standard 26, the lower end of which is bolted to the lower end of the spring bar 27, which supports the seat 28. This standard has a bearing 29 at its upper end in which is mounted a shaft 30 which is formed with a downwardly extending arm 31 and an upwardly extending lever arm 32 provided with a foot piece 33. The arm 31 is connected by a rod 34 to the outer end of the crank arm 21 of the rock shaft 17. The said lever constitutes a foot lever which the driver of the machine may operate at any time to cause the rock shaft 17 to partly turn and hence cause the lifter arm 22 together with the chain 24 to raise the gathering and dumping frame 1 so as to cause the said dumping frame to clear the hay gathered on the carrier straps and hence by the movement of the machine, causing the cut hay to be swept rearwardly from the carrier straps and to lodge on the ground in line with a windrow and to become part thereof. The runner or head 9 is provided with an upwardly and rearwardly extending finger 36. A stop strap 37 is bolted on the tongue 20 at a point in rear of the bearings 18 and serves to limit the rearward movement of the crank 21 when the rake attachment is raised.

I claim:—

In combination with the cutting mechanism of a mowing machine comprising a finger bar and a cutter bar, a series of carrier straps connected to and extending rearwardly from the finger bar and provided at their rear ends with down-turned runners to bear on the ground, and a gathering and releasing frame connected to the said cutting mechanism for vertical movement, the said gathering and releasing frame when lowered bearing on the said straps at points in advance of said runners.

In testimony whereof I hereunto affix my signature in the presence of two witnesses.

EDWIN SEVERSON.

Witnesses:
 GEORGE BEISIGL,
 PAULINE MAGSTADT.

---

Copies of this patent may be obtained for five cents each, by addressing the "Commissioner of Patents, Washington, D. C."